United States Patent [19]

Lee

[11] Patent Number: 5,478,022
[45] Date of Patent: Dec. 26, 1995

[54] OVERLOAD PREVENTION DEVICE OF FILM WINDING/REWINDING MOTOR FOR A CAMERA

[75] Inventor: Sang-geol Lee, Changwon-si, Rep. of Korea

[73] Assignee: Samsung Aerospace Industries, Ltd., Kyeongsangnam-do, Rep. of Korea

[21] Appl. No.: 175,569

[22] Filed: Dec. 30, 1993

[30] Foreign Application Priority Data

Dec. 30, 1992 [KR] Rep. of Korea .................. 1992-26736

[51] Int. Cl.⁶ .................................................. G03B 1/00
[52] U.S. Cl. ........................................... 242/333; 354/212
[58] Field of Search ............................... 242/333, 333.6, 242/333.7, 356.5, 356.2; 354/213, 214, 212, 173.1

[56] References Cited

U.S. PATENT DOCUMENTS

| | | | |
|---|---|---|---|
| 2,213,746 | 9/1940 | Schubert | 242/356.5 X |
| 4,202,513 | 5/1980 | Osanai | 242/333.7 |
| 4,998,686 | 3/1991 | Lin | 242/333 |

FOREIGN PATENT DOCUMENTS 2101756  1/1993  United Kingdom .................. 242/333

*Primary Examiner*—John M. Jillions
*Attorney, Agent, or Firm*—Finnegan, Henderson, Farabow, Garrett and Dunner

[57] ABSTRACT

An overload protection device for the film winding/rewinding motor of a camera to prevent breakage of the camera by detecting an overload of a winding motor controlled by a one comma switch. The overload detection device includes a driving part, a planetary gear part and an overload detection part.

21 Claims, 2 Drawing Sheets

OVERLOAD PREVENTION DEVICE OF FILM WINDING/REWINDING MOTOR FOR A CAMERA

BACKGROUND OF THE INVENTION

1. Field of The Invention

The present invention relates to an overload prevention device for a film winding/rewinding motor for a camera and, more, particularly to an overload prevention device for a film winding/rewinding motor for a camera which can prevent a breakage of the camera and the teeth of a film advance gear by preventing an overload of a winding motor rotated in state that a one comma switch (a comma switch is defined as a switch for transferring one frame of the film in the camera herein) is not turned OFF when finishing a photograph, and by controlling an operation of the motor.

2. Description of the Prior Art

Generally, a motor is operated in accordance with a three comma switch when a film is charged in a camera, and three frames of the film are transferred, so that a winding/rewinding motor for transferring the film of a high quality camera enters a standby mode to take the photograph. The winding motor is operated in accordance with the operation of a one comma switch if after each photograph is finished, the film is automatically transferred. When the roll of film is fully used the motor is rotated by a separate circuit in a reverse direction and the exposed film is rewound.

However, less than one frame of film is transferred in case of the transfer of the frame of the film when the photograph is finished, and in a predetermined time interval, all frames of the film are rewound. At this time, since less than one frames of film was transferred in the case of the last one frame of the film and a remaining part of the last frame of the film was not transferred, the one comma switch remains in the ON state. AS the result, the winding motor is continuously rotated and an overload occurs. The overload is sensed by a circuit and the rotation of the motor is controlled.

The device for sensing the overload of the motor and stopping the operation of the motor is embodied, as well known, by an electrical circuit. Conventionally, when the film comes to the last frame of the film, the one comma switch is turned ON, the motor is rotated and all the frames of the photographed film are rewound.

Accordingly, in case of the film photographed in accordance with the operation of the motor, the motor is continuously rotated since the one comma switch is continuously turned ON in the state that less than one frame of the film is transferred.

An overload occurs to the motor when it is continuously rotated in a state when the film is not transferred. To prevent the overload of the motor, it is common to use a capacitor that is charged to an overcharged state. When this occurs a high level is applied to a base terminal of a transistor, the motor is turned OFF, the rotation of the motor stops and at the same time, all the frames of the film photographed completely will have been rewound by the operation of the rewinding circuit.

However, if the circuit malfunctions, the overload of the motor can not be prevented in advance, which causes breakdown. Also, it is very difficult to fix the camera when it is broken and the repair cost may not be justified for middle and low class cameras. As a result, there is a problem in that the camera can not satisfy the purchasers.

SUMMARY OF THE INVENTION

An object of the present invention is to overcome the problems of the prior art camera, by providing an overload prevention device for a film winding/rewinding motor for a camera which can prevent the breakage of the camera and teeth of the film advance gear by detecting an overloading of a winding motor rotated under the control of a one comma switch (a comma switch is defined as a switch for transferring one frame of the film in the camera herein) is not turned OFF when finishing a photograph, and controlling the operation of the motor.

To achieve this and other objects of the present invention and in accordance with the purpose of the invention, as embodied and broadly described herein, an overload prevention device for a film winding/rewinding motor for a camera includes: a driving part for transmitting a rotational force of the motor to a film transfer part; a planetary gear receiving a rotational force from the driving part; an overload prevention part engaged with the planetary gear and rotated in accordance with rotation of the planetary gear and a contact switch connected to the winding/rewinding motor and the overload prevention part to control the winding/rewinding motor to prevent overload.

In addition, according to another aspect of the present invention, an overload detection device for a film winding/rewinding motor for a camera includes a one comma switch, a driving part having a first drive gear mounted on a motor shaft, the driving part being operated in accordance with an ON/OFF operation of the one comma switch, and a second drive gear capable of idling up when a predetermined overload occurs; a planetary gear elastically mounted on one side by a spring and having a rotatable planetary lever with planetary teeth; a reduction gear group disposed between the driving part and the planetary gear part to reduce the rotating speed of the driving part; and an overload detection part including a third drive gear fixed on the shaft and selectively engaged with the planetary gear, a first tension spring fixed to a side of the planetary lever and elastically supporting the third drive gear at an upper portion of the third drive gear, and a second tension spring fixed to a side of a contact switch and elastically supporting a lower portion of the third drive gear.

The objects and advantages of the invention will be set forth in part in the description which follows, and in part will be obvious from the description, or may be learned by practice of the invention. The objects and advantages of the invention will be realized and attained by part of the elements and combinations particularly pointed out in the appended claims.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENT

The preferred embodiment of the present invention will now be described in detail with reference to the appended drawings.

Figure 1:
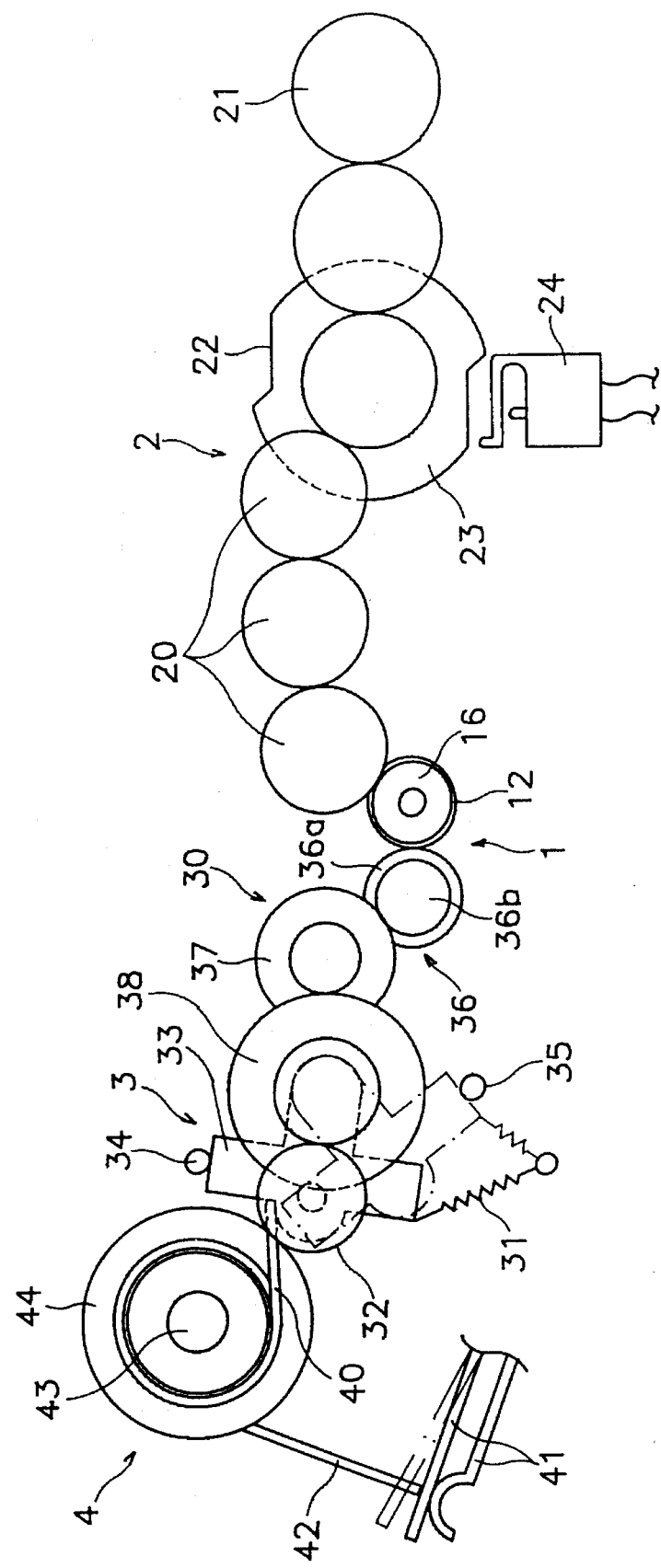
FIG. 1 is a plan view illustrating a construction of an overload prevention device for a film winding/rewinding motor for a camera in accordance with an embodiment of the present invention.
Figure 2:
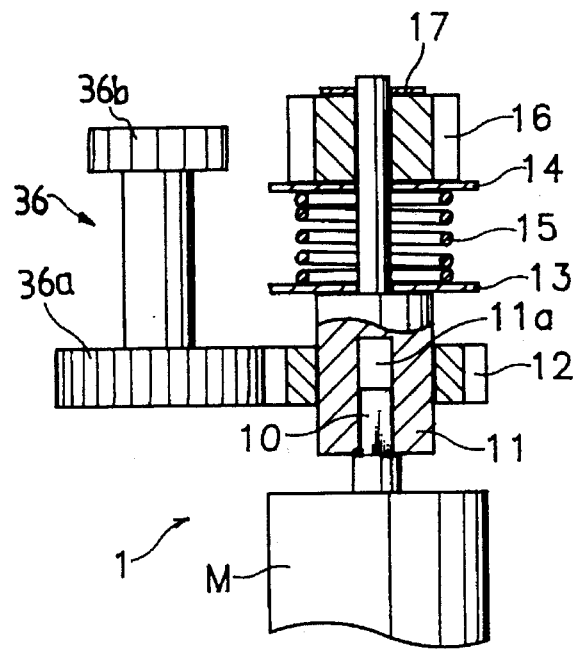
FIG. 2 is a sectional side view of a driving part related to the preferred embodiment of the present invention.

Referring to FIGS. 1 and 2, an overload prevention device for a camera includes a driving part 1, a film transfer part 2, a planetary gear part 3 and an overload prevention part 4.

The driving part 1 includes a polygonal projection 10 formed on a top end portion of a shaft of a motor M selectively operated by a one comma switch as shown in FIG. 2, and a rotation member 11 having a polygonal groove 11a for receiving the projection 10. The driving part rotates together with the motor M.

A first drive gear 12 is fixed on an outer circumferential face of the rotation member 11, and spring sheets 13, 14 are provided on the upper part of the rotation member 11 and are elastically supported by an elastic member 15. The second drive gear 16 is located on the upper portion of the spring sheet 14 and fixed by a fixing member such as a pin 17 not to be separated, and disposed to selectively transfer rotational force to the film transfer part 2. And when the load of the film transfer part 2 is greater than the elastic force of the elastic member 15, the second drive gear 16 is idled.

The film transfer part 2 receives the rotational force of the motor M by a plurality of idle gears 20 engaged into the second drive gear 16 in the driving part 1. A cam 23 having a cam portion 22 is provided between the idle gear 20 and the winding gear 21. Therefore, the winding gear 21 engaged into the cam 23 can be rotated. The one comma switch 24 is turned "ON/OFF" by a rotation of the cam 23 and controls the operation of the motor M, such that one frame of the film is automatically transferred.

Further the planetary gear part 3 which is engaged into the first drive gear 12 fixed to the rotation member 11 in the driving part 1 includes a reduction gear group 30 having first, second and third reduction gears 36, 37, 38 for reducing a rotation speed of the motor M. Also, a planetary lever 33 is elastically supported by a spring 31 and is rotatably mounted to a shaft of the third reduction gear 38. The planetary gear 32 is rotated by a rotation of the third reduction gear 38.

Stoppers 34, 35 are formed on a predetermined position of the planetary gear part 3 to limit the rotation range of the planetary lever 33.

The first reduction gear 36 of the reduction gear group 30 engaged into the first drive gear 12 in the rotation member 11 is preferably formed by two steps 36a, 36b to overcome a space limitation.

Figure 3:
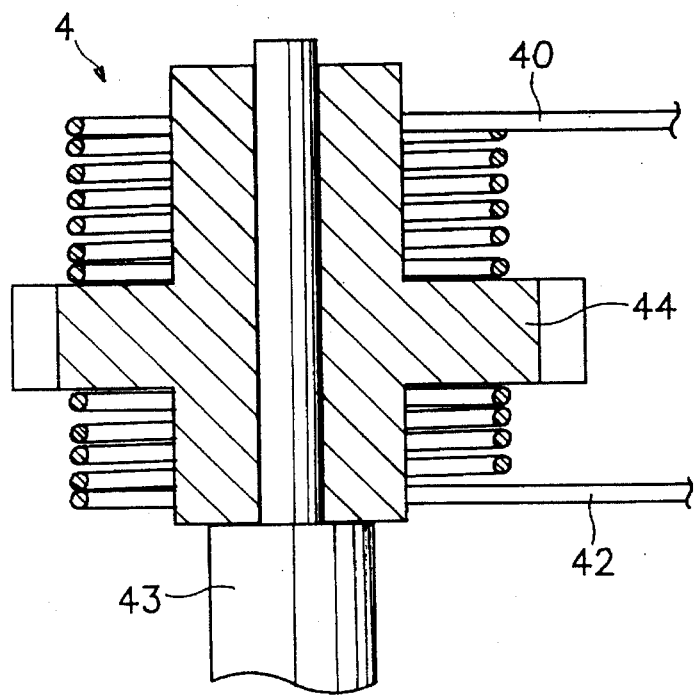
FIG. 3 is a sectional side view of an overload prevention part related to the preferred embodiment of the present invention.

On the other hand, an overload prevention part 4 includes a gear 44 selectively engaged into the planetary gear 32 of the planetary gear part 3, a first tension spring 40 fixed to one side of the planetary lever 33 and elastically wound around an upper portion of the gear 44, and a second tension spring 42 fixed to one side of a contact switch 41 and elastically wound around a lower portion of the gear 44 fixed on the shaft 43 as shown in FIG. 3. The contact switch 41 is operated in accordance with the change of the elastic force of the second tension spring 42 in accordance with the rotation of the gear 44, and the overload prevention part 4 controls the overload of the motor M.

The elastic forces of the first and second tension springs 40, 42 in the overload prevention part 4 for preventing the overload of the motor before the overload of the motor M occurs are preferably less than the elastic forces of the spring 31 in the planetary gear part 3 and the contact switch 41.

In the present invention as described above, one frame of the film is photographed and the motor M is operated. The rotational force of the motor M is transferred to the cam 22 by the idle gears 20 engaged into the second drive gear 16 of the rotation member 11, such that the cam 22 in the film transfer part 2 rotates. At the same time, the winding gear 21 is rotated and the film is advanced by one frame. The motor M rotates when the one comma switch 24 contacts the outer circumferential face of the cam 23, the ON position. Since the one comma switch 24 is turned OFF when it contacts the cam portion 22 of the cam 23, the operation of the motor M stops. At this point one frame of the film has been transferred completely.

When one frame of the film is transferred, the rotational force of the motor M is reduced by the reduction gear group 30 engaged into the first drive gear 12 of the rotation member 11, and the reduced rotational force is transferred to the planetary gear 32 in the planetary gear part 3. The planetary gear 32 is engaged into the gear 44 in the overload prevention part 4 as the planetary lever 33 in the state shown by a dot-dash line of FIG. 1 overcomes the elastic force of the spring 31 and rotates clockwise as shown by a full line.

Accordingly, the gear 44 in the overload prevention part 4 is rotated by a predetermined amount, but since the rotation amount of the gear 44 is set in accordance with the transfer amount of one frame of the film, the first and second tension springs 40, 42 are not wound around the gear 44 enough to pull the spring 31 and contact switch respectively, therefore, the contact switch 41 is not opened. When one frame of the film is completely transferred, the planetary lever 33 returns to an initial state by the restoring force of the spring 31 as shown by the dot-dash line of FIG. 1.

The one comma switch 24 is maintained ON when a series of operations are repeated and the photographing of the film is finished. When the last frame of the film is photographed and the film is transferred by the film transfer part 2, the motor M rotates continuously. However, if less than one frame of the photographed film is transferred and the motor M rotates even though film is not being transferred, overload occurs.

At this time, the second drive gear 16 mounted on the shaft of the rotation member 11 is not rotated since the transfer of the film stops, and only rotation member 11 is idled. The rotational force of the motor M is transferred by the first drive gear 12 fixed on the outer circumferential face of the rotation member 11 to the reduction gear group 30, and is reduced and transferred to the planetary gear 32 of the planetary gear part 3 by the reduction gear group 30.

Accordingly, the turning effect of the motor M is transferred to the gear 44 in the overload detection part 4 and is continuously operated, so that the first and second tension springs 40, 42 are continuously wound around the gear 44, therefore, the elastic forces of the first tension spring 40 and the second tension spring 42 increase. In accordance with this operation, since the elastic force of the first tension spring 40 is greater than that of the spring 31 and is not restored to the initial state, and concurrently the elastic force of the second tension spring 42 is greater than that of the contact switch 41, the contact switch 41 is turned OFF as shown by the dot-dash line of FIG. 1 and thus the overload of the motor M is prevented.

If the film is rewound from this state, the rotation of the motor M is made to the opposite direction. The planetary lever 33 having the planetary gear 32 is returned by the restoring force of the spring 31 to the initial state and the planetary gear 32 is separated from the gear 44. Concurrently the gear 44 in the overload prevention part 4 is returned by the restoring forces of the first and second tension springs 40, 42 to the initial state. Accordingly, the contact switch 41 is restored to the initial state as shown by the full line of FIG. 1.

As described above, the present invention prevents the overload of the motor M which occurs when taking the photograph of the last frame of film on a roll by the mechanical planetary gear part, and selective operation of the contact switch operated by the second tension spring elastically wound around the gear in the overload prevention part. As a result, the durability of the motor is increased, and the basic price is reduced when applied to the middle and low class cameras, so that it satisfies the customers' interest and the productivity of the product is increased. In addition, the breakage of the product due to the defect of the circuit can be prevented, the quality of the product is improved and trust in the product is increased.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An overload prevention device for a film winding/rewinding motor for a camera comprising:

a film transfer part;

a driving part for transmitting a rotational force of the motor to said film transfer part;

a planetary gear part receiving rotational force from said driving part;

a contact switch for turning the winding/rewinding motor ON and OFF; and an overload prevention part engaged with said planetary gear part and rotated upon rotation of said planetary gear part, said contact switch being connected to said winding/rewinding motor to turn the winding/rewinding motor OFF upon detection of an overload by said overload prevention part, wherein said overload prevention part includes an overload gear selectively engaged with the planetary gear part, a first tension spring fixed to a side of the planetary gear part and elastically supported to the overload gear, and a second tension spring fixed to a side of said contact switch and elastically supported to said overload gear.

2. The overload prevention device of claim 1, wherein the motor includes a shaft, and said driving part includes a rotation member mounted on said shaft, a first drive gear mounted around said rotation member, and a second drive gear for transmitting the rotational force of the motor to the film transfer part, said second drive gear being mounted to be capable of idling when a predetermined overload occurs.

3. The prevention device of claim 2, wherein said first and second drive gears have an elastic member therebetween.

4. The overload prevention device of claim 3, wherein said first and second drive gears have a spring sheet contacted to said elastic member.

5. The overload prevention device of claim 3, wherein the second drive gear is idled when the load of a film transfer is greater than the elastic force of said elastic member.

6. The overload prevention device of claim 1, wherein said planetary gear part is elastically mounted on one side by a spring and includes a rotatable planetary lever having a planetary gear.

7. The overload prevention device of claim 6, wherein the elastic forces of the first and second tension springs of the overload prevention part for preventing the overload of the motor are less than the elastic force of the spring in the planetary gear part and the contact switch before overload occurs.

8. The overload prevention device of claim 6, further including stoppers formed on predetermined positions in the planetary gear part to define a rotation range.

9. The overload prevention device of claim 6, wherein said planetary lever is rotatably mounted on a shaft of said overload gear in order to rotate in accordance with rotation of said overload gear.

10. The overload prevention device of claim 1, wherein said device further includes a reduction gear group disposed between the driving part and the planetary gear part to reduce the rotating speed of the driving part.

11. The overload prevention device of claim 1, wherein the motor includes a motor shaft and said driving part has a projection on a top end portion of the motor shaft and a groove in a rotation member for receiving the projection of said motor shaft.

12. The overload prevention device of claim 1, wherein said first tension spring is wound around a first portion of said overload gear and said second tension spring is wound around a lower portion of said overload gear.

13. An overload prevention device for a film winding/rewinding motor for a camera having a film transfer part comprising:

a shaft rotated by the motor;

a driving part including a rotation member mounted on said shaft of the motor, a first drive gear mounted around said rotation member, and a second drive gear for transmitting rotational force of the motor to the film transfer part, said second drive gear being mounted to be capable of idling when a predetermined overload occurs;

a planetary gear part elastically mounted on one side by a spring and having a rotatable planetary lever having a planetary gear;

a reduction gear group disposed between the driving part and the planetary gear part to reduce the rotating speed of the driving part; and an overload prevention part including an overload gear selectively engaged with the planetary gear of the planetary gear part, a first tension spring fixed to a side of the planetary lever and elastically supported to the overload gear, and a second tension spring fixed to a side of a contact switch for turning the winding/rewinding motor ON and OFF and elastically supported to said overload gear, said overload prevention part for determining the occurrence of an overload and turning off the winding/rewinding motor in response thereto.

14. The overload prevention device of claim 13, wherein said shaft has a polygonal projection on a top end portion thereof and said rotation member has a polygonal groove for receiving the projection of said shaft of the motor.

15. The prevention device of claim 13, wherein said first and second drive gears have an elastic member therebetween.

16. The overload prevention device of claim 15, wherein said first and second drive gears have a spring sheet contacted to said elastic member.

17. The overload prevention device of claim 15, wherein the second drive gear is idled when load of the film transfer part is greater than the elastic force of the elastic member.

18. The overload prevention device of claim 13, wherein the elastic forces of the first and second tension springs of the overload prevention part for preventing the overload of the motor are less than the elastic force of the spring in the planetary gear part and the contact switch before overload occurs.

19. The overload prevention device of claim 13, further including stoppers formed on predetermined positions in the planetary gear part to define a rotation range.

20. The overload prevention device of claim 13, wherein said planetary lever is rotatably mounted on a shaft of a reduction gear of said reduction gear group to rotate in accordance with rotation of said reduction gear.

21. The overload prevention device of claim 13, wherein said first tension spring is wound around an upper portion of said overload gear and said second tension spring is wound around a lower portion of said overload gear.

* * * * *